United States Patent [19]

Nguyen

[11] 4,091,319

[45] May 23, 1978

[54] METHOD AND APPARATUS TO RECHARGE A BATTERY ABOARD AN ELECTRIC VEHICLE

[75] Inventor: Phi Duy Nguyen, Asnieres, France

[73] Assignee: Societe de Traction Cem - Oerlikon, Paris, France

[21] Appl. No.: 753,870

[22] Filed: Dec. 23, 1976

[30] Foreign Application Priority Data

Jan. 23, 1976 France .................................. 76 01824

[51] Int. Cl.$^2$ ............................ B60L 1/00; H02P 1/00
[52] U.S. Cl. ............................................. 320/9; 191/4; 307/66; 318/106; 318/139
[58] Field of Search ................. 320/2, 9, 56; 318/105, 318/106, 107, 139, 332, 345; 307/46, 64, 66; 191/2, 3, 4; 104/148 R

[56] References Cited

U.S. PATENT DOCUMENTS

| | | | |
|---|---|---|---|
| 1,250,231 | 12/1917 | Schoepf | 318/139 X |
| 1,352,480 | 9/1920 | Schoepf | 318/106 X |
| 3,821,626 | 6/1974 | Maver et al. | 307/66 X |
| 4,019,108 | 4/1977 | Elvin | 318/139 X |
| 4,037,145 | 7/1977 | Bailey et al. | 318/332 |

*Primary Examiner*—Robert J. Hickey
*Attorney, Agent, or Firm*—Burns, Doane, Swecker & Mathis

[57] ABSTRACT

A method and an apparatus to recharge a power supply aboard a vehicle which is driven by one or more electric traction motors. The motors are capable of being fed by the power supply aboard the vehicle or by an exterior power supply source through an energy regulating circuit aboard the vehicle. The energy regulating circuit is utilized to feed the electric traction motors and to recharge the power supply aboard the vehicle. The energy regulating circuit operates at a constant rate whereby the energy not absorbed by the one or more electric traction motors is utilized to recharge the power supply aboard the vehicle. A command circuit is associated with the energy regulating circuit to assure that the output of the energy regulating control circuit has a constant current output.

9 Claims, 2 Drawing Figures

METHOD AND APPARATUS TO RECHARGE A BATTERY ABOARD AN ELECTRIC VEHICLE

BACKGROUND OF THE INVENTION

1. Field of Invention

The present invention relates to a vehicle having a power supply source aboard which requires recharging, and more specifically to a process and an apparatus to permit the recharging of the power supply source energy aboard the vehicle which vehicle is driven by one or more electric traction motors capable of also being fed by said power supply and an exterior power supply source (via) an energy regulating circuit.

2. Description of Prior Art

For certain transport applications, for example, public transport, the utilization of electric vehicles is foreseen capable of functioning, on the one hand by tapping energy from a fixed feed system (for example, by a third rail or a catenary supplying a monophase or polyphase alternating current or a direct current), and on the other hand, the energy could be supplied by a power source of various types such as thermal, inertial or electrochemical, etc., aboard the vehicle.

During the energy collecting operation, the regulation of the speed of the vehicle is usually provided by an energy regulating circuit which is more often of the electronic type. This regulating circuit is for example constituted by a controlled rectifier bridge circuit in the case of an alternating current source or a controlled chopper circuit in the case of a direct current source if the traction motor is of the DC type. Other regulating circuits may be utilized, particularly if the type of motor is changed. For example, an electronic inverter will be utilized with a traction motor of the asynchronous type.

For autonomous operation, the various sources of energy utilized aboard the vehicle, and particularly the inertial or electro-chemical sources, require a recharge that can be made on the vehicle during operation where the energy can be collected. This recharge permits a reduction of the size of the power supply source to be carried aboard and further prevents the handling charges necessary for the recharge of a power supply of the fixed post type.

For recharging the power supply carried aboard a vehicle, the obvious solution is to utilize a special charger. The principal inconveniences of this solution are the additional weight of the charger, limited space in the vehicle and the price for this special charger.

SUMMARY OF THE INVENTION

A principal feature of the present invention is to eliminate the above mentioned inconveniences.

According to such feature, the present invention is characterized in that there is utilized the energy regulating circuit for the feed of the traction motor(s) and for the recharge of the power supply aboard.

According to a preferred embodiment of the present invention, the energy regulating circuit for the traction motor(s) is operated at a constant rate, and the energy not absorbed by the traction motor(s) is utilized for recharging the power supply aboard.

In accordance with a broad aspect of the present invention there is provided a method and an apparatus to recharge a power supply aboard a vehicle which is driven by one or more electric traction motors. The motors are capable of being fed by the power supply aboard the vehicle or by an exterior power supply source through an energy regulating circuit aboard the vehicle. The energy regulating circuit is utilized to feed the electric traction motors and to recharge the power supply aboard the vehicle. The energy regulating circuit operates at a constant rate whereby the energy not absorbed by the one or more electric traction motors is utilized to recharge the power supply aboard the vehicle. A command circuit is associated with the energy regulating circuit to assure that the energy regulating control circuit has a constant current output.

BRIEF DESCRIPTION OF THE DRAWINGS

A detailed description of the two embodiments of the present invention will now be described with reference to the accompanying drawings in which.

DESCRIPTION OF PREFERRED EMBODIMENT

Figure 1:
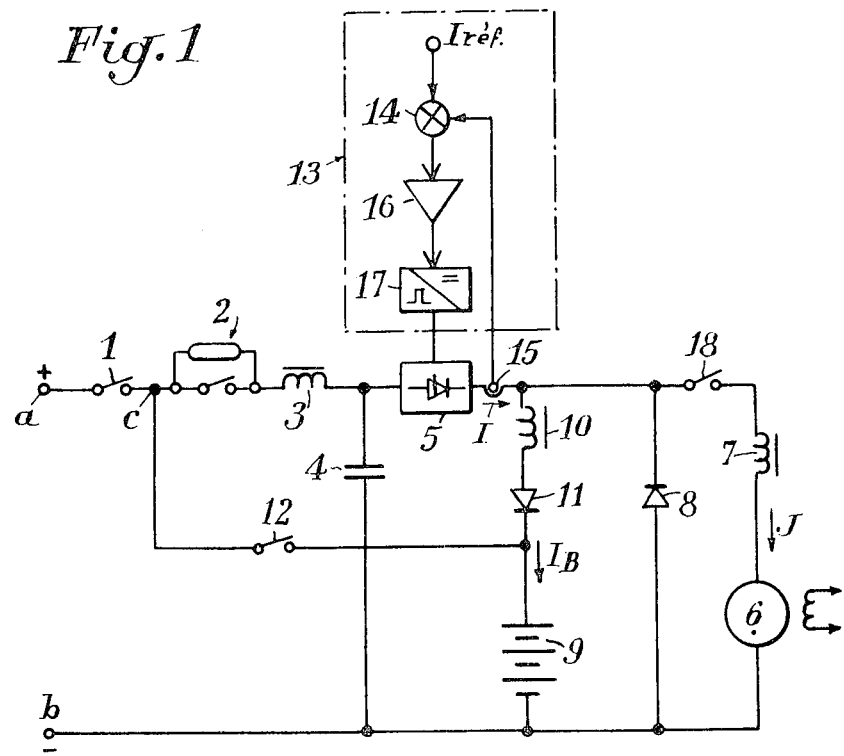
FIG. 1 is a schematic diagram of the electric circuit of the present invention in the case where the power supply aboard is a battery and where the exterior power supply for the electric motor(s) of the vehicle is provided by a DC source.

Referring now to FIG. 1, there is shown a pair of terminals $a$ and $b$ between which there is connected the positive and negative poles, respectively, of an exterior DC current source (not shown) to supply power to the electric traction motor(s) 6 of the vehicle (not shown). The motors are usually connected in a series arrangement, as is well known in the art. Across terminals $a$ and $b$ there is connected a series arrangement of components comprising:

(a) a switch 1 which permits the equipment to be placed in service;

(b) a protection circuit 2, which is constituted for example by a switch and a fuse connected in parallel;

(c) an inductance coil 3 of an input filter associated with a chopper circuit 5 which also contains a bypass capacitor 4;

(d) the chopper circuit 5 is of known construction and is provided to regulate the supply to the traction motor 6 of the vehicle;

(e) a smoothing induction coil 7; and (f) the traction motor 6.

A free-wheeling diode 8, is connected in parallel with the traction motor 6 and the coil 7. Also a series connection of a battery 9, which constitutes the source of energy aboard the vehicle, a second induction coil 10 and a uni-directional diode 11, is connected in parallel across the traction motor 6 and the coil 7.

A second switch 12 connects the positive terminal of the battery 9 to a junction point "c" between the switch 1 and the protection circuit 2.

During the voltage regulation phase, as long as the average voltage at the output of the chopper 5 is smaller than the voltage of the battery 9, only a reduced current will pass through the battery 9. The current delivered by the chopper 5, and which is assumed to be constant as will be explained later, corresponds approximately to the starting current of the traction motor 6.

For a voltage approximately equal to that of the battery and of which the value is defined as a function of the battery type utilized, a command circuit 13 controls the chopper 5 to deliver a constant output current I (which may be different from the starting current of the traction motor 6). For example, the command circuit 13 can be constructed to operate in the following manner. In the comparator 14 a reference current $I_{ref}$ is compared with the output current from the chopper 5 or a proportional current obtained by a pick-up element 15. The signal at the output of the comparator 14 is amplified by an amplifier 16 and then fed to a pulse generator 17 which pilots the chopper 5. The difference of this circuit from the prior art circuits in which the impulse generator is utilized primarily to pilot the chopper in a manner to cause the speed of the electric motor to vary, is that in the present circuit the pulse generator 17 is also used in combination with the elements 14, 15 and 16 to cause the chopper 5 to put out a constant current. This pulse generator 17 can be of a fixed frequency type or of a variable frequency type according to the type of chopper utilized.

The electric traction motor 6 is a separate excitation type of traction motor. The regulation of the separate excitation may be effected in a classic mode to permit the motor to receive the current J necessary to obtain the desired traction performances of the vehicle. The difference of the current, that is to say $I_b = I - J$, will pass automatically in the battery 9. Because J diminishes as the speed increases, the current $I_b$ increases as a result of this. This is also the case for the voltage at the terminals of the battery. The command circuit 13 is precisely arranged to act on the average voltage at the output of the chopper in a manner to maintain the current I constant.

This mode of operation causes the voltage at the terminals of the motor to increase progressively up to the obtention of the equilibrium speed, although usually this voltage is practically constant from the end of the period of constant starting effort.

In periods of autonomous operation of the system, the first switch 1 is open whilst the second switch 12 is closed in order to permit the chopper 5 and consequently the motor 6 to be fed by the battery 9.

During periods where the vehicle is stopped, whilst switch 1 is closed and when the system is connected to an exterior supply source, a third switch 18 is provided in the circuit of the motor 6 whereby the battery 9 may be charged by the chopper 5 without the motor 6 being connected to the supply. It can be seen that the switch 18 is connected in such a manner whereby the freewheeling diode 8 is also connected in the circuit whilst the battery 9 is being charged and the motor 6 is disconnected.

During braking periods of the vehicle, the kinetic energy of the motor can be advantageously recovered in a known manner whereby it can be utilized in such a way as to permit direct recharging of the battery 9. The excitation of the motor can be regulated manually or automatically whereby the motor 6 will function as a generator and put out a current through the induction coil 10 and the diode 11 to recharge the battery 9. The diode 11 will let the recharging current pass therethrough whilst preventing the battery 9 from discharging directly in the direction of the motor 6, during periods of operation, as well as in the autonomous operation mode and in the functioning by supply of energy from an exterior supply source.

The above description corresponds to a motor having separate excitation. The utilization of series excitation or compound excitation motors is equally possible but it imposes additional limitations and notably that which concerns the respective value of the voltages and namely the collected voltage at the terminals a and b and that of the battery 9. Nevertheless, the solution is achievable and can be defined by calculations.

Figure 2:
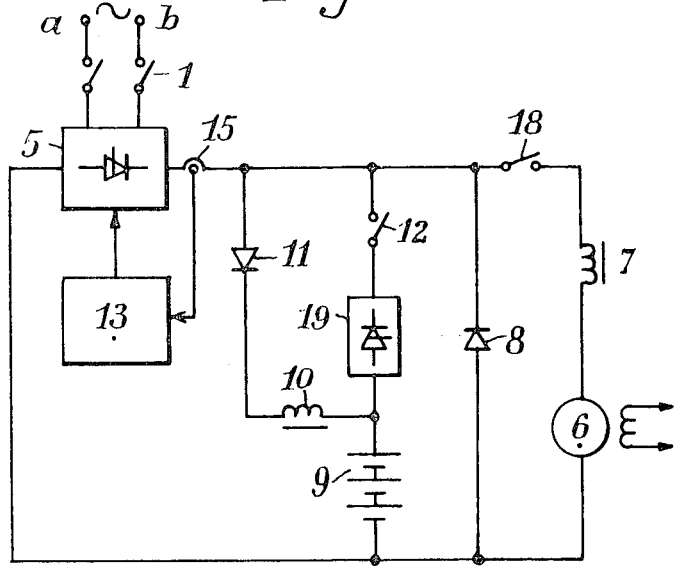
FIG. 2 is a schematic diagram of the electric circuit of the present invention in the case where the power supply aboard is a battery and where the exterior power supply source for the motor(s) is an AC source.

Referring now to FIG. 2 there is shown an embodiment of the present invention, wherein the exterior supply source is a monophase current source. The embodiment shown by FIG. 2 differs from that shown by FIG. 1 in that the control circuit 5, which serves both to regulate the supply voltage fed to the motor 6 and the recharging of the battery 9, is no longer provided by a chopper, but by a control rectifier bridge, of which one of the diagonals is connected via the switch 1 to the terminals a and b, which are themselves connected to the exterior supply source (not shown). The command circuit 13 associated with bridge 5 can also be of an analogous construction as the one shown in FIG. 1. However, in that case the pulse generator 17 is a fixed frequency generator dependent upon the frequency of the monophase current supplied by the exterior supply source.

The positive terminal of the battery 9 is connected to the switch 12 through a chopper circuit 19 and the series connection of the chopper circuit 19 and the switch 12 is connected to a by-pass series circuit provided by the series connection of diode 11 and inductance coil 10. It is noted, however, that the chopper circuit 19 is connected in such a way as to permit the passage of current from the positive terminal of the battery 9 to the motor 6 when the second and third switches 12 and 18, respectively, are closed. The diode 11 is connected as in the previously described embodiment, in a manner to prevent the battery 9 to discharge in the direction of the motor 6.

The operation of the embodiment shown in FIG. 2 is very similar to the operation of the previous embodiment. When the energy supply is collected from an exterior supply source, the switches 1 and 18 are closed, whilst the switch 12 is open. In these conditions, the control rectifier bridge circuit 5 permits the supply to the motor 6 and the recharging of the battery 9 (through diode 11). In periods where the vehicle is stopped, the switch 18 is open, either manually or automatically, in such a manner to cause rectifier bridge circuit 5 to recharge the battery 9.

During braking periods of the vehicle, the separate excitation of motor 6 can be regulated manually or automatically, in such a manner to cause the motor 6 to function as a generator to recharge the battery 9.

Finally, for the autonomous operation of the vehicle with the battery 9, the first switch 1 is open whilst the second and third switches 12 and 18 are closed. In these conditions the motor 6 is fed by the battery 9 through the chopper circuit 19.

The two embodiments described above utilize a battery as a source of energy aboard the vehicle. The present invention may, however, utilize other types of sources of power supply aboard the vehicle. For example, in the case of an inertial source constituted by a fly-wheel turning at a more or less high speed and associated with a generator, the energy regulating circuit 5 can also be utilized in the same manner to feed back the energy to the fly-wheel. For this application, the circuit 5 is connected in a manner to feed the generator which functions as a motor to maintain the speed of the fly-wheel.

It is also well understood that the mode of operation described above relates to the examples described and should not be limited thereto as numerous modifications can be made within the scope of the present invention.

I claim:

1. A method for recharging a power supply aboard a vehicle driven by one or more electric traction motors, said motors capable of being fed by said power supply aboard the vehicle in an autonomous operating mode or by an exterior power supply source through an energy regulating circuit, said energy regulating circuit being utilized for feeding the said one or more electric traction motors and for recharging the power supply, said method being characterized in that said energy regulating circuit operates at a constant rate whereby the energy not absorbed by the said one or more electric traction motors is utilized to recharge the power supply aboard the vehicle.

2. A method according to claim 1, wherein the kinetic energy of the vehicle is recuperated during braking periods of the vehicle and is utilized to recharge the said power supply aboard the vehicle.

3. Apparatus to recharge a power supply aboard a vehicle driven by one or more electric traction motors capable of being fed by said power supply aboard the vehicle in an autonomous mode or an exterior power supply source through an energy regulating circuit, said apparatus comprising two terminals adapted to be connected to said exterior power supply source; there being a series connection of a first switch, a protection circuit, an energy regulating control circuit to regulate the energy supplied to said motors, a first induction coil and at least one electric traction motor for the vehicle across said terminals; a free wheeling diode connected in parallel with said first induction coil and said motor, the said power supply aboard the vehicle being connected to the output of said energy regulating control circuit whereby said power supply is recharged at the same time as said at least one traction motor is fed, said apparatus being characterized in that a command circuit is associated with said energy regulating control circuit to assure that the output of the energy regulating control circuit has a constant current output.

4. Apparatus according to claim 3, wherein the power supply aboard the vehicle is a battery, said battery being connected to the output of the energy regulating control circuit through a second induction coil and a uni-directional diode to prevent the discharge of the battery into the said motor.

5. Apparatus according to claim 4, in which the exterior power supply source is a DC source, said battery being connected via a second switch to a junction point between said first switch and said protective circuit to feed said motor through said energy regulating control circuit when said first switch is open and said second switch is closed.

6. Apparatus according to claim 5, wherein said energy regulating control circuit is a chopper circuit.

7. Apparatus according to claim 4, wherein the exterior power supply is an AC source, said battery being connected in parallel with said motor; said battery supplying said motor through said first induction coil, said energy regulating control circuit and a second switch when closed with said first switch being open.

8. Apparatus according to claim 7, wherein said energy regulating control circuit is a control rectifier bridge.

9. Apparatus according to claim 3, wherein a third switch is connected in series with said first induction coil, said third switch being open when said vehicle is in an inoperative condition.

* * * * *